US007543669B2

(12) United States Patent  (10) Patent No.: US 7,543,669 B2
Kelahaara  (45) Date of Patent: Jun. 9, 2009

(54) SNOWMOBILE AND TUNNEL THEREOF

(75) Inventor: Jarmo Kelahaara, Saarenkylä (FI)

(73) Assignee: BRP Finland Oy, Rovaniemi (FI)

( * ) Notice: Subject to any disclaimer, the term of this patent is extended or adjusted under 35 U.S.C. 154(b) by 287 days.

(21) Appl. No.: 11/551,575

(22) Filed: Oct. 20, 2006

(65) Prior Publication Data

US 2007/0089920 A1  Apr. 26, 2007

Related U.S. Application Data

(60) Provisional application No. 60/728,771, filed on Oct. 21, 2005.

(51) Int. Cl.
    *B62M 27/02*  (2006.01)
(52) U.S. Cl. ..................... 180/190; 180/193
(58) Field of Classification Search .............. 180/190, 180/193
    See application file for complete search history.

(56) References Cited

U.S. PATENT DOCUMENTS

| 3,840,083 | A  | * | 10/1974 | Woods | 180/312 |
|---|---|---|---|---|---|
| 4,069,883 | A  | * | 1/1978 | Cousineau | 180/185 |
| 5,791,429 | A  | * | 8/1998 | Bergman | 180/193 |
| 5,904,217 | A  | * | 5/1999 | Yamamoto et al. | 180/193 |
| 6,499,551 | B2 | * | 12/2002 | Karpik | 180/190 |
| 6,561,302 | B2 | * | 5/2003 | Karpik | 180/291 |
| 6,691,812 | B2 | * | 2/2004 | Karpik | 180/190 |
| 6,796,395 | B1 | * | 9/2004 | Berg et al. | 180/190 |
| 6,880,660 | B1 | * | 4/2005 | Berg et al. | 180/190 |
| 6,889,787 | B2 | * | 5/2005 | Karpik | 180/190 |
| 6,926,107 | B2 | * | 8/2005 | Nishijima | 180/190 |
| 6,926,108 | B1 | * | 8/2005 | Polakowski et al. | 180/190 |
| 7,059,440 | B1 | * | 6/2006 | Berg et al. | 180/190 |
| 7,124,848 | B2 | * | 10/2006 | Girouard et al. | 180/184 |
| 7,128,180 | B2 | * | 10/2006 | Polakowski et al. | 180/190 |
| 7,328,765 | B2 | * | 2/2008 | Ebert et al. | 180/190 |
| 7,448,462 | B2 | * | 11/2008 | Etou | 180/190 |
| 2006/0108164 | A1 | * | 5/2006 | Wubbolts et al. | 180/190 |
| 2006/0162977 | A1 | * | 7/2006 | Etou | 180/190 |
| 2007/0193715 | A1 | * | 8/2007 | Bergman et al. | 165/41 |

FOREIGN PATENT DOCUMENTS

CA  2523999 A1 * 4/2007

* cited by examiner

*Primary Examiner*—Paul N Dickson
*Assistant Examiner*—Patrick Centolanzi
(74) *Attorney, Agent, or Firm*—Osler, Hoskin & Harcourt LLP

(57) ABSTRACT

A snowmobile is disclosed having a tunnel to accommodate and cover the drive track of the snowmobile underneath and to support the straddle seat of the snowmobile above. The tunnel includes portions interconnecting the sidewalls of the tunnel to the top portion of the tunnel and which provides clearances to fit a narrower straddle seat thereon thereby improving manoeuvrability and rider comfort. A straddle seat adapted to register with the tunnel is also disclosed.

22 Claims, 7 Drawing Sheets

SNOWMOBILE AND TUNNEL THEREOF

CROSS REFERENCES TO RELATED APPLICATIONS

The present Utility Patent Application claims priority from U.S. Provisional Patent Application No. 60/728,771 filed Oct. 21, 2005, the content of which is incorporated herein by reference.

FIELD OF THE INVENTION

The present invention relates generally to a snowmobile and in particular to a snowmobile tunnel.

BACKGROUND OF THE INVENTION

Snowmobiles typically include a frame having a front portion for mounting the engine and the front suspension and a rear portion consisting of a tunnel conventionally made of sheet metal to accommodate and cover the drive track and rear suspension of the snowmobile underneath and to support the straddle seat of the snowmobile above. Snowmobile tunnels conventionally have a square c-shape profile which means that the side walls of the tunnel are generally perpendicular to the top portion of the tunnel. The side walls of the tunnel typically extend downwardly from the top portion of the tunnel in a generally orthogonal manner. The side walls of the tunnel are spaced apart to receive the drive track therebetween and are provided with mounting points for the rear suspension. A pair of footrests is typically mounted to the outer portion of each side wall to help position and support the rider in a comfortable posture while providing adequate ground clearance for the snowmobile.

FIG. 1 is a rear cut-away view of a conventional snowmobile in which the tunnel 12 has a square c-shape profile defined by the top portion 12a and the sidewalls 12b. The upper portion of the drive track 16 is accommodated within the tunnel 12 and the rear suspension assembly 18 is mounted to a transverse shaft 20 itself mounted to the sidewalls 12b. A pair of footrests 26 is mounted to the outer side of each side wall 12b. A straddle seat 14 comprising a rigid supporting framework 22 is mounted onto the tunnel 12 and the width $T_1$ of the tunnel 12 generally dictates the minimum width $S_1$ of the straddle seat 14.

When a rider is cornering aggressively, he leans his body weight towards the inside of the corner to affect the center of gravity of the snowmobile in such a way that his body is positioned on the inner side of the straddle seat, his inside upper leg resting on the straddle seat with the lower leg holding on to the side of the straddle seat. In a conventional snowmobile design as depicted in FIG. 1, the edge 24 of the straddle seat 14 may press into the leg of the rider causing discomfort and rendering the aggressive driving experience less pleasant.

For snowmobiles having wide tracks, the problem is exacerbated since the tunnel 12 has to be wider to accommodate wider track 16 and the straddle seat 14 is typically at least as wide as the tunnel 12. With a wider straddle seat 14, the edge 24 of the straddle seat 14 will be in contact with the leg of the rider as soon as the rider begins to lean into the corners and it may even be difficult to lean into a corner without having to lift one's foot off the outside footrest 26. Furthermore, the wider seat 14 associated with a wide track may even be uncomfortable for a shorter person to straddle as his or her legs must be spread at least as wide as the straddle seat.

One solution to the problem associated with extra-wide seats has been to place a standard-size seat, i.e. a seat designed for a standard 15-inch tunnel, on a tunnel that is designed for a 20- or 24-inch wide track. However, this solution exposes the wide tunnel structure and the edges of the wide tunnel which end up being directly in contact with the rider's legs and this contact tends to transfer the normal vibrations of the snowmobile directly to the rider. Furthermore, the edges of the wide tunnel having a typical square profile tend to press into the rider's legs during aggressive cornering, causing discomfort.

Thus, there is a need for a snowmobile having a tunnel design that alleviates some of the problems related to conventional tunnel design and improves the comfort of the rider in various manoeuvring.

STATEMENT OF THE INVENTION

One aspect of the present invention is to provide a snowmobile having a frame including a tunnel adapted to support a narrow straddle seat.

Another aspect of the present invention is to provide a snowmobile having an improved tunnel that can be integrated into conventional snowmobiles without having to repackage or re-engineer the rear suspension and drive train components.

Another aspect of the present invention is to provide a snowmobile comprising: a frame including a tunnel, the tunnel extending along a length of the snowmobile and having forward and rearward portions, the tunnel including a top portion, a pair of spaced apart sidewalls, and at least the forward portion of the tunnel having portions interconnecting each sidewall with the top portion whose exterior surfaces form at least two angles therebetween. The snowmobile also includes an engine disposed on the frame; a drive track disposed below and supported by the tunnel and operatively connected to the engine for propulsion of the snowmobile; two skis disposed on the frame, each via a front suspension; a straddle seat disposed on the tunnel above the drive track and rearward of the engine; and a steering assembly disposed on the frame forward of the seat and operatively connected to the skis.

In an additional aspect, the exterior surfaces of the interconnecting portions respectively form a first angle with the top portion and a second angle with each sidewall.

In a further aspect, the exterior surfaces of the interconnecting portions form a bevel between the top portion and each sidewall.

In a further aspect of the present invention, the interconnecting portions are integrally formed with the sidewalls of the tunnel, integrally formed with the top portion of the tunnel or integrally formed with both the sidewalls and the top portion of the tunnel.

Another aspect of the present invention is to provide a snowmobile comprising a frame including a tunnel, the tunnel extending along a length of the snowmobile and having forward and rearward portions, the tunnel including a top portion, a pair of spaced apart sidewalls, and at least the forward portion of the tunnel having a width of the top portion of the tunnel being less than a width of the tunnel defined by a distance between the spaced apart sidewalls.

In an additional aspect, the width of the top portion of the tunnel is less than the distance between the spaced apart sidewalls throughout the length of the tunnel.

In an additional aspect, Another aspect of the present invention is to provide a snowmobile wherein the straddle seat has a width that is less than the width of the tunnel.

In an additional aspect of the present invention is to provide a straddle seat for snowmobile having a tunnel including a top portion, a pair of spaced apart sidewalls and interconnecting portions connecting each sidewall with the top portion; the straddle seat comprising: a rigid support base extending generally along a length of a snowmobile, the rigid support base having side portions whose profile is adapted to register with the interconnecting portions of the tunnel, and a padded portion mounted to the rigid support base including a top surface and a pair of side surfaces extending downwardly from the top surface;

In a further aspect of the present invention the straddle seat includes a rigid support base having angled side portions that register with the interconnecting portions.

For the purpose of the present application, the term 'bevel' means the angle that one surface makes with another surface when they are not at right angle.

Embodiments of the present invention each have at least one of the above-mentioned aspects, but not necessarily have all of them.

Additional and/or alternative features, aspects and advantages of the embodiments of the present invention will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where.

DESCRIPTION OF PREFERRED
EMBODIMENT(S)

Figure 2:
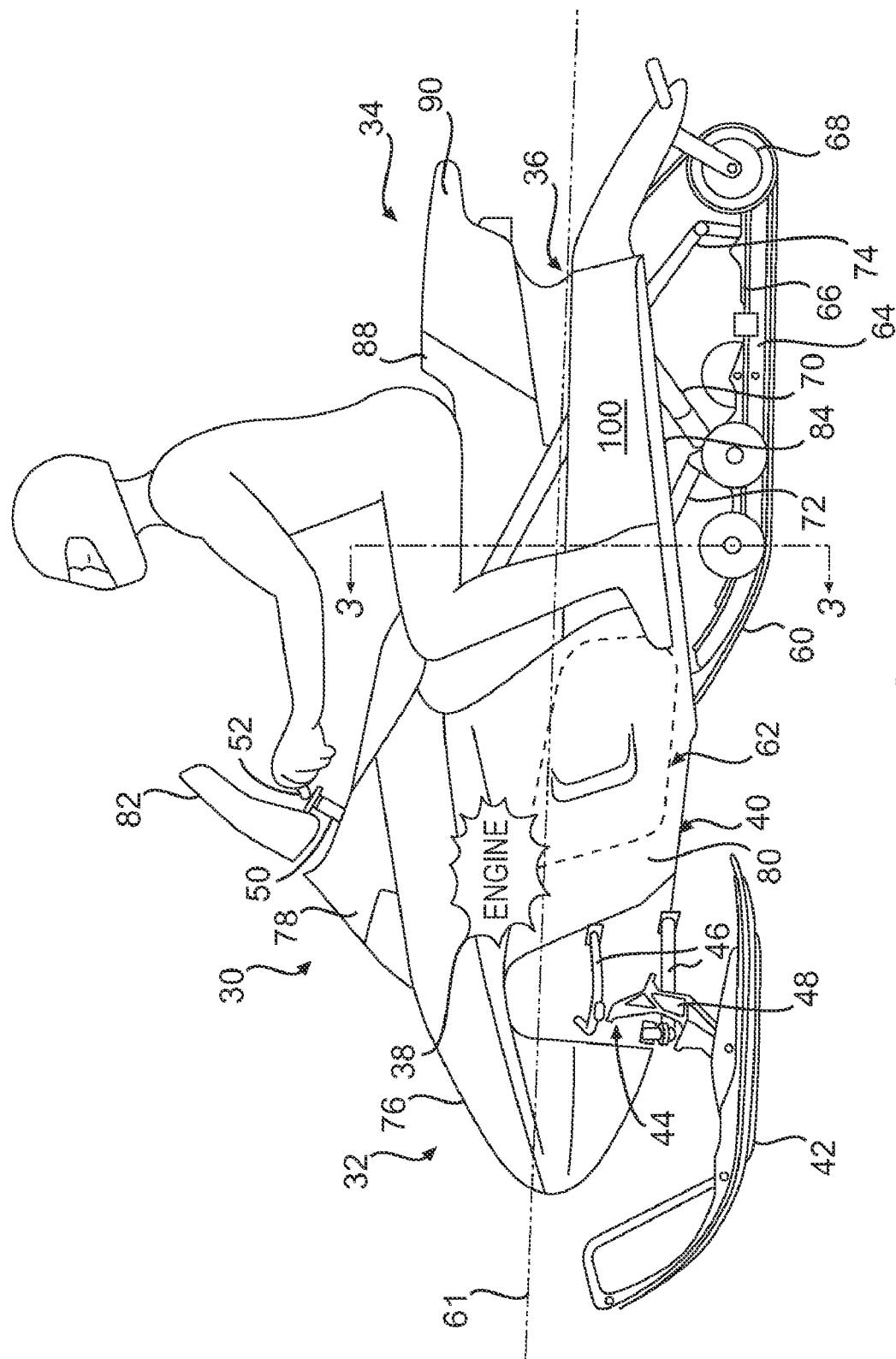
FIG. 2 is a side elevational view of a snowmobile incorporating a tunnel in accordance with one embodiment of the invention.

FIG. 2 illustrates a snowmobile 30 in accordance with one specific embodiment of the invention. The snowmobile 30 includes a forward end 32 and a rearward end 34 which are defined consistently with a travel direction of the vehicle. The snowmobile 30 includes a frame 36 comprising an engine cradle portion 40 and a tunnel 100 in accordance with one embodiment of the present invention, which will be described in detail below. While hidden behind a front fairing 54, an engine 38, schematically illustrated, provides motive force for the snowmobile 30 and is carried by the engine cradle portion 40 of the frame 36.

Two front skis 42 are attached to the forward end of the frame 36 through a front suspension system 44. The front suspension system 44 generally comprises a double A-arm type suspension, having a pair of A-arms 46 on either side of the vehicle linking a ski leg 48 to the frame 36. The ski legs 48 are attached the skis 42 at a lower end and to the upper and lower A-arms 46 at an upper end thereof. The ski legs 48 preferably include ball joints (not shown) at the attachment points with the upper and lower A-arms 46 for operatively connecting the respective ski legs 48 to A-arms 46 and to a steering column 50. The steering column 50 is attached at its upper end to a steering device such as a handlebar 52 which is positioned forward of a rider and slightly behind the engine 38 to rotate the ski legs 48 and the skis 42, thereby providing directional control of the snowmobile 30. Thus, by turning the steering device 52, the ski legs 48 are pivoted and the skis 42 are turned to steer the snowmobile 30 in a desired direction.

An endless drive track 60 is disposed under tunnel 100 of the frame 36 with the upper portion of the drive track 60 accommodated within the tunnel 100. The endless drive track 60 is operatively connected to the engine 38 through a belt transmission system 62 which is schematically illustrated by broken lines. The endless drive track 60 is driven to run about a rear suspension assembly 64 for propulsion of the snowmobile 30. The rear suspension assembly 64 includes a pair of slide rails 66 which generally position and guide the endless drive track 60 and include idler wheels 68 engaged thereto. The slide rails 66 typically include a sliding lower surface made of polyethylene to reduce contact friction between the slide rails 66 and the drive track 60. The rear suspension assembly 64 also includes one or more shock absorbers 70 which may further include a coil spring (not shown) surrounding the individual shock absorbers 70. Rear suspension arms 72 and 74 are provided to attach the slide rails 66 and idler wheels 68 to the tunnel 100 of the frame 36.

At the front end 32, the snowmobile 30 includes an external shell consisting of fairings 76 that enclose and protect the engine 38 and transmission 62 and that can be decorated to render the snowmobile 30 more aesthetically pleasing. Typically, the fairings 76 include a hood 78 and one or more side panels 80 which can be opened to allow access to the engine 38 and the transmission 62 when this is required, for example, for inspection or maintenance. The side panels 80 can be opened away from the snowmobile 30 along a vertical axis, independently from the hood 78, which pivots forward about a horizontally extending axis. A windshield 82, which may be connected either to the fairings 76 or directly to the handlebars 52, acts as wind deflector to lessen the force of the air on the rider when the snowmobile is moving.

A straddle-type seat 88 is positioned atop and mounted to the tunnel 100 and extends from the rear end 34 of the snowmobile 30 to the fairings 76. Two footrests 84, generally extending outwardly from the tunnel 100, are also positioned on either side of the straddle seat 88 to accommodate the rider's feet and provide a rigid platform for the rider to stand on when maneuvering the snowmobile 30. A rear portion of the straddle seat 88 may include a storage compartment 90 or a passenger seat (not shown).

Figure 3:
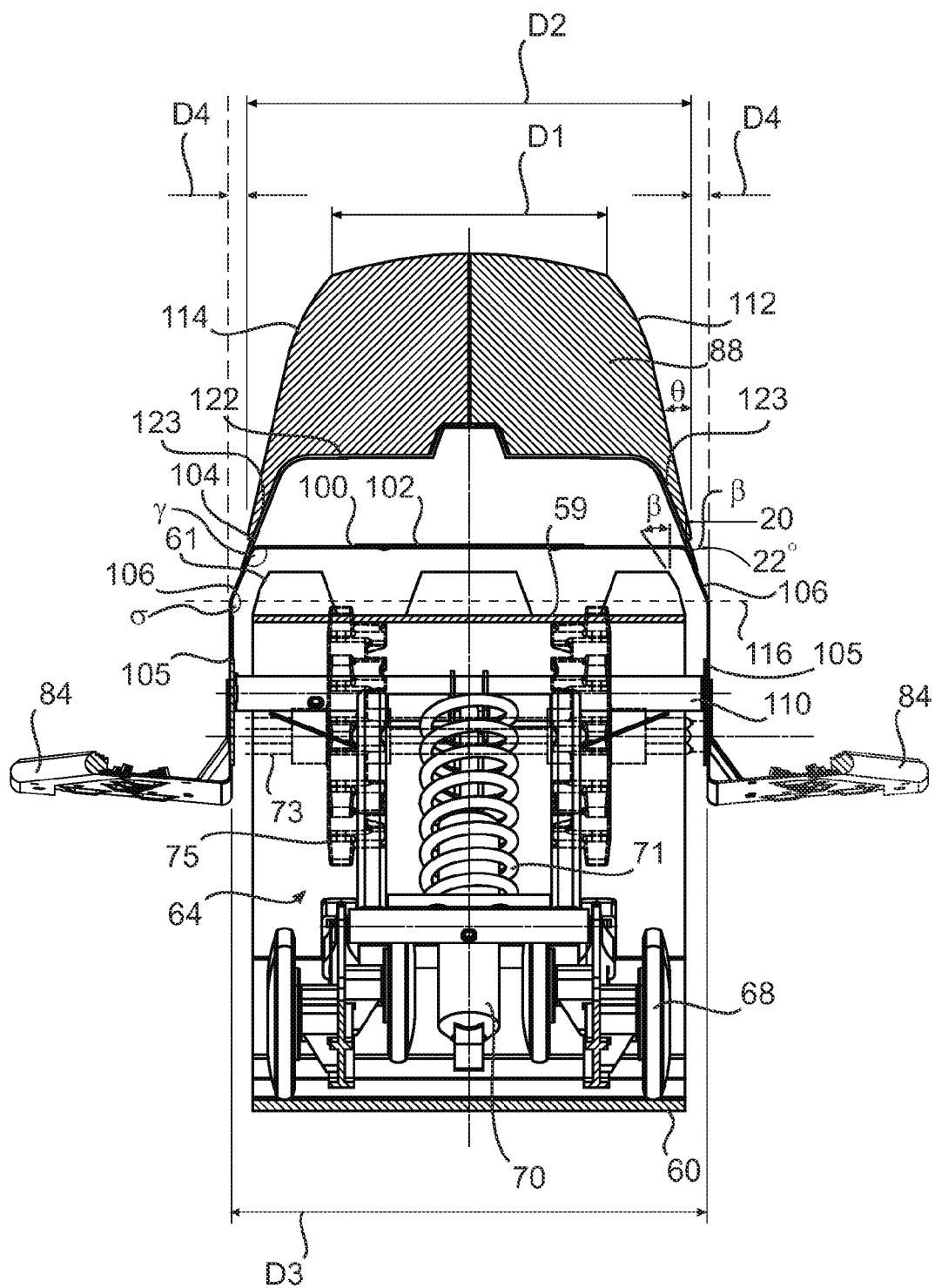
FIG. 3 is a cross-sectional view of the snowmobile illustrated in FIG. 2 taken at line 3-3.

FIG. 3 is a cross-sectional view of the snowmobile 30 taken at line 3-3 of FIG. 2. As illustrated, the tunnel 100 has a generally planar horizontal top portion 102 and a pair of generally planar vertical sidewalls 105 depending downwardly from the edges 104 of the top portion 102. The straddle seat 88 is mounted and supported by tunnel 100 as illustrated. The sidewalls 105 are spaced apart to accommodate the upper portion 59 of the endless drive track 60. The sidewalls 105 are connected to the top portion 102 through interconnecting portions 106 such that the exterior surfaces of the interconnecting portions 106 form two angles γ and σ therebetween, giving the upper end of the tunnel 100 an angular profile. In the particular embodiment illustrated in FIG. 3, the exterior surfaces of the interconnecting portions 106 form a bevel between the top portion 102 and each sidewall 105. In a preferred embodiment, the interconnecting portions 106 are angled inwardly from the sidewalls 105 to connect the side edges 104 of the top portion 102 of the tunnel 100 thereby reducing the overall width of the top portion 102 and freeing room to accommodate a narrow straddle seat 88 having either a rigid support base 122 as illustrated in FIG. 3. The support base 122 of straddle seat 88 includes side portions 123 and is mounted on and supported by the top portion 102 and the interconnecting portions 106.

In the illustrated embodiment, the interconnecting portions 106 is integrally formed with the top portion 102 and the sidewalls 105. The entire tunnel 100 including the interconnecting portions 106 is formed of a single sheet of metal bent to shape. However, the interconnecting portions 106 may be formed integrally with either the top portion 102 or the sidewalls 105. The interconnecting portions 106 may therefore either flare outwardly and downwardly from the side edges 104 of the top portion 102 or extend inwardly and upwardly from the sidewalls 105 to connect the top portion 102 to the sidewalls 105 with fasteners or by welding.

Footrests 84 are mounted to the outer side of each sidewall 105 and depend therefrom.

As illustrated in FIG. 3, the straddle seat 88 includes a support base 122 that fits onto and registers with the interconnecting portions 106 of the tunnel 100. The support base 122 which is typically a molded plastic understructure, preferably includes side portions 123 angled at the same angle β as the interconnecting portions 106 such that the support base 122 of the seat 88 mates and registers with the interconnecting portions 106 to provide a secure fit between the straddle seat 88 and the tunnel 100. The straddle seat 88 is designed with a padded upper portion having slanted side surfaces 112 and 114 that provide added room for the rider to manoeuvre from side to side and to generally enhance his comfort. The side surfaces of the padded upper portion of the straddle seat 88 are preferably slanted at the same angle as the interconnecting portions 106 but can be slanted at a different angle. As shown in FIG. 3, the support base 122 of the straddle seat 88 is angled at the same angle β as the interconnecting portion 106 whereas the slanted side surfaces 112 and 114 of the padded upper portion of the straddle seat 88 are angled at a more shallow angle θ relative to the vertical. The interconnecting portions 106 preferably have symmetrical angles β ranging from 20° to 24° from the vertical. More preferably, the bevel angle β is 21° to 23° and, most preferably, β=22°.

The tunnel 100 in accordance with the invention can be readily integrated into conventional snowmobiles without having to repackage or re-engineer the rear suspension 64 and endless drive track 60. The position and layout of rear suspension components such as, for example, the shock absorber 70, coil spring 71, and idler wheels 68, need not be modified or relocated. Similarly, any transversely mounted shafts used for connecting the rear suspension 64 to the tunnel 100, such as the transverse shaft 110 used to anchor the top end of the shock 70, is mounted to the sidewalls 105, beneath the interconnecting portions 106. Since the tunnel 100 can be readily used on a snowmobile without repackaging the components of the rear suspension, the tunnel 100 provides a practical and useful improvement in snowmobile tunnel technology.

FIG. 3 illustrates, by way of example only, a snowmobile having a 15-inch track in which the straddle seat 88 supported by tunnel 100 preferably has a width D2 which is less than the overall width D3 of the tunnel defined by the distance between the sidewalls 105. In a preferred embodiment the width of the straddle seat is equal to 90-95% of the overall width D3 of the tunnel, although this proportion can of course be varied beyond this range. It should be expressly understood that the tunnel in accordance with the invention can be applied to snowmobiles having any track size, including wide-track snowmobiles having 20-inch or 24-inch tracks and therefore the ranges, percentages and ratios mentioned herein are merely meant to serve as an example, and are therefore not intended to be limiting in any manner whatsoever. In the example shown in FIG. 3 (where the tunnel is sized to accommodate a standard 15-inch track), the top portion 102 of the tunnel 100 preferably has a width D2 that is between 85% and 95% of the overall width D3 of the tunnel, whereby a horizontal projection of each interconnecting portion correspondingly has a width D4=(D3−D2)/2 between 2.5% and 7.5% of the overall width D3 of the tunnel 100. More preferably, and again by way of example only, the width D2 of the top portion 102 of the tunnel is equal to 88% to 92% of the width D3 of the tunnel and the width D4 of the horizontal projection of each interconnecting portion is equal to 4% to 6% of the overall width D3 of the tunnel. Most preferably, and again by way of example only, the width D2 of the top portion 102 is equal to 90% of the overall width D3 of the tunnel and the width D4 of the horizontal projection of each interconnecting portion is equal to 5% of the width D3 of the tunnel.

Preferably, and again by way of example only, a vertical projection of each interconnecting portion may have a height equal to 26-30% (and more preferably 28%) of a height of each vertical portion which includes the sidewalls 105 and the interconnecting portions 106. For greater certainty, it bears repeating that the foregoing ranges, percentages and ratios are presented solely for the purposes of example to illustrate the best mode known to the applicant(s) of implementing the invention on a snowmobile tunnel designed for a standard-size 15-inch track, and therefore should not be construed in any way as delimiting the scope of the invention.

Figure 1:
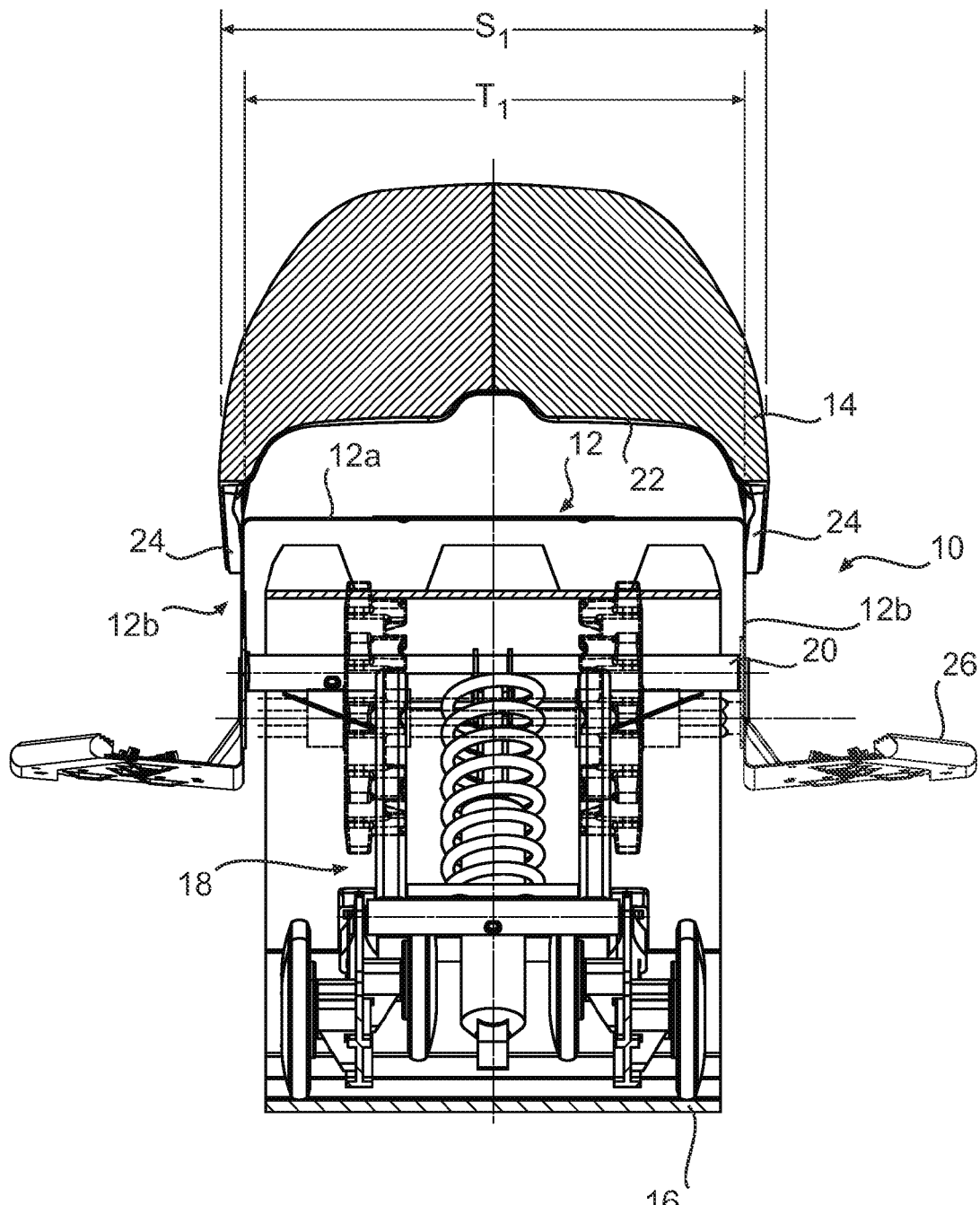
FIG. 1 is a rear cut-away view of a prior art snowmobile having a conventional tunnel.

As illustrated in FIG. 3, the tunnel 100 and more specifically, the interconnecting portions 106 forming a bevel between the top portion 102 and the sidewalls 105 provides the means to fit a narrower straddle seat 88 on a snowmobile and therefore provides added room for the rider to manoeuvre the vehicle as well as enhances the general comfort of a rider, especially for wide-track snowmobiles. Compared to the "square-profile" prior-art tunnel shown in FIG. 1, the interconnecting portions 106 of the tunnel 100 shown in FIG. 3 reduces the width D1 of the upper portion of the straddle seat 88 and therefore provide room for the legs of the rider. As shown in FIG. 3, the angles of the interconnecting portions 106 and of the slanted side surfaces 112 and 114 of the padded upper portion of the straddle seat 88 are chosen to optimize comfort without sacrificing vehicle control. Accordingly, as will be appreciated by those of ordinary skill in the art, the angles of the interconnecting portion 106 and of the slanted side surfaces 112 and 114 can be varied for different types of snowmobiles.

As further illustrated in FIG. 3, the endless drive track 60 has a plurality of lugs 61 extending outwardly from the endless drive track 60 to provide increased traction in the snow, as is known in the art. Each of the lugs 61 has a base attached to the outer surface of the drive track 60 and a tip extending away from the base. At least a portion of each lug 61 extends above a horizontal plane 116 that demarcates the lowest point of the interconnecting portion 106 of the tunnel 100, i.e. where the interconnecting portion 106 of the tunnel 100 meets the sidewalls 105 of the tunnel. Preferably, the lugs 61 are beveled at the same bevel angle (e.g. β=22°) as the interconnecting portions 106 in order to enable compact but interference-free packaging of the drive track 60 under the tunnel 100.

As further illustrated in FIG. 3, a front drive axle 73 (which is operatively connected to the transmission system 62 in a manner well known in the art) is, in turn, rotatably mounted to the sidewalls 105 beneath the horizontal plane 116 defined by where the interconnecting portions 106 and the sidewalls 105 are connected. A drive sprocket 75 is driven by the front drive axle 73 to drive the endless drive track 60, as is well known in the art. In a preferred embodiment, the drive sprocket 75 is located and rotates entirely below the horizontal plane 116 to prevent any potential interference between the drive track 60 and the tunnel 100.

Figure 4:
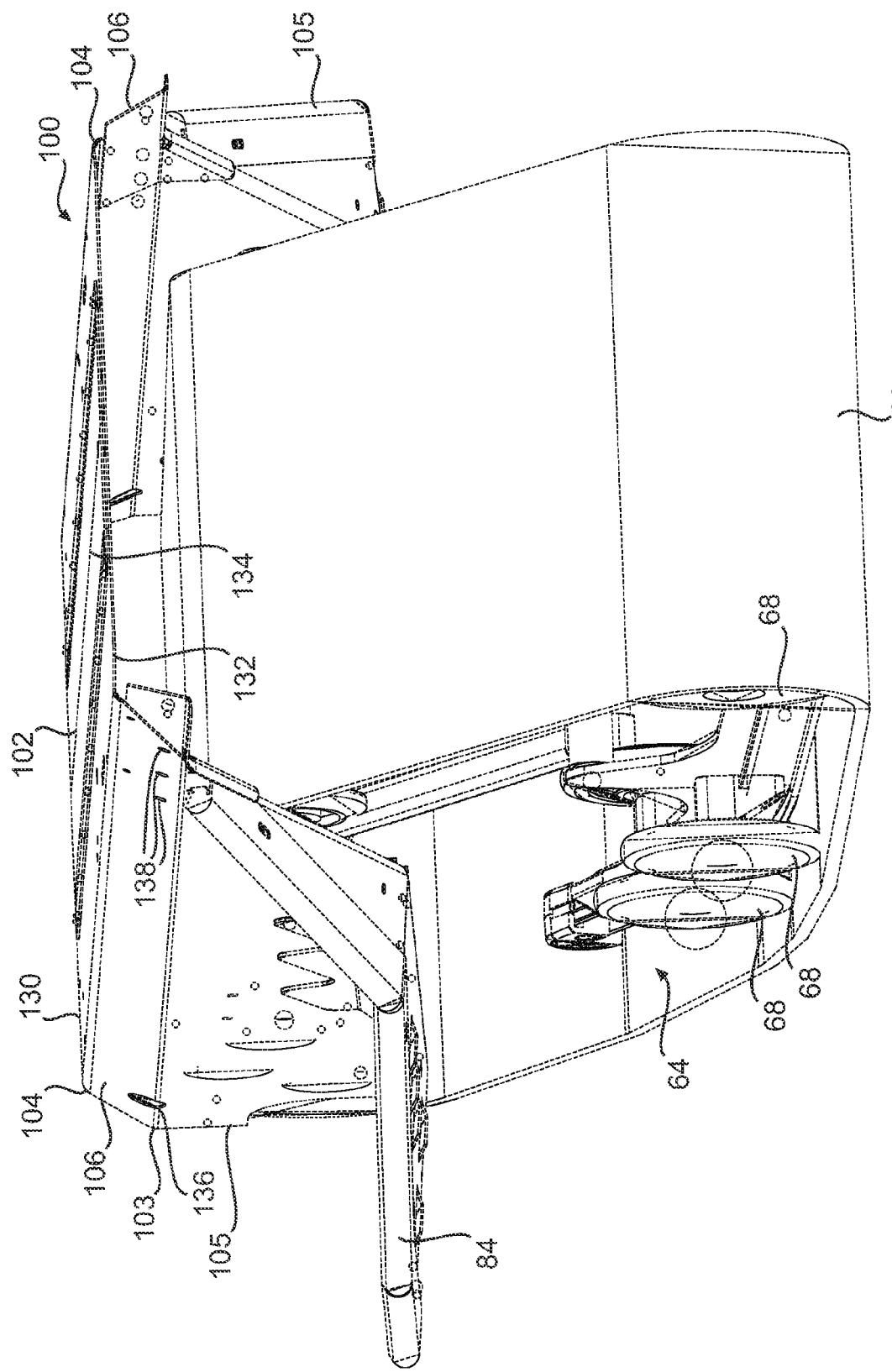
FIG. 4 is a rear isometric view of a drive track and associated rear suspension mounted to a tunnel in accordance with one embodiment of the invention.

FIG. 4 is an isometric rear perspective view of the tunnel 100 illustrated in FIG. 3 with its endless drive track 60 and associated rear suspension system 64. The interconnecting portions 106 extend the entire length of the tunnel 100 from the front end 130 of the tunnel 100 to the rear end 132 of the tunnel 100. The tunnel 100 is formed of a single sheet of metal bent at the first edge 104 and at the second edge 103 thereby forming the interconnecting portions 106. The tunnel 100 is preferably manufactured from aluminum or a suitable aluminum alloy, although other high-stiffness, high-strength, light-weight materials could be substituted. As illustrated more specifically in FIG. 5, the bending angles γ and σ are both obtuse angles which together define the interconnecting portions 106 and connect the generally horizontal top portion 102 of the tunnel 100 with the generally vertical sidewalls 105 of the tunnel 100. The angles γ and σ may vary substantially to accommodate various angles β depending on the design requirements.

The top portion 102 of the tunnel 100 may be provided with one or more reinforcement segments 134 to add rigidity and strength to the top portion 102. As well, the interconnecting portions 106 may be provided with reinforcement segments to add rigidity and strength to the interconnecting portions 106. Similarly, the angles γ and σ may be reinforced to add rigidity to the tunnel 100.

Referring back to FIG. 4, the tunnel 100 is provided with forward mounting points 136 and rearward mounting points 138 located in the interconnecting portions 106 to securely fastened the support base 122 of the straddle seat 88 (FIG. 3) to the tunnel 100. The straddle seat 88 may be fastened to the tunnel 100 by any means known to those skilled in the art. For example, brackets conforming to the profile of the interconnecting portions 106 mounted on the straddle seat can be used to secure the straddle seat 88 to the tunnel 100

Figure 5:
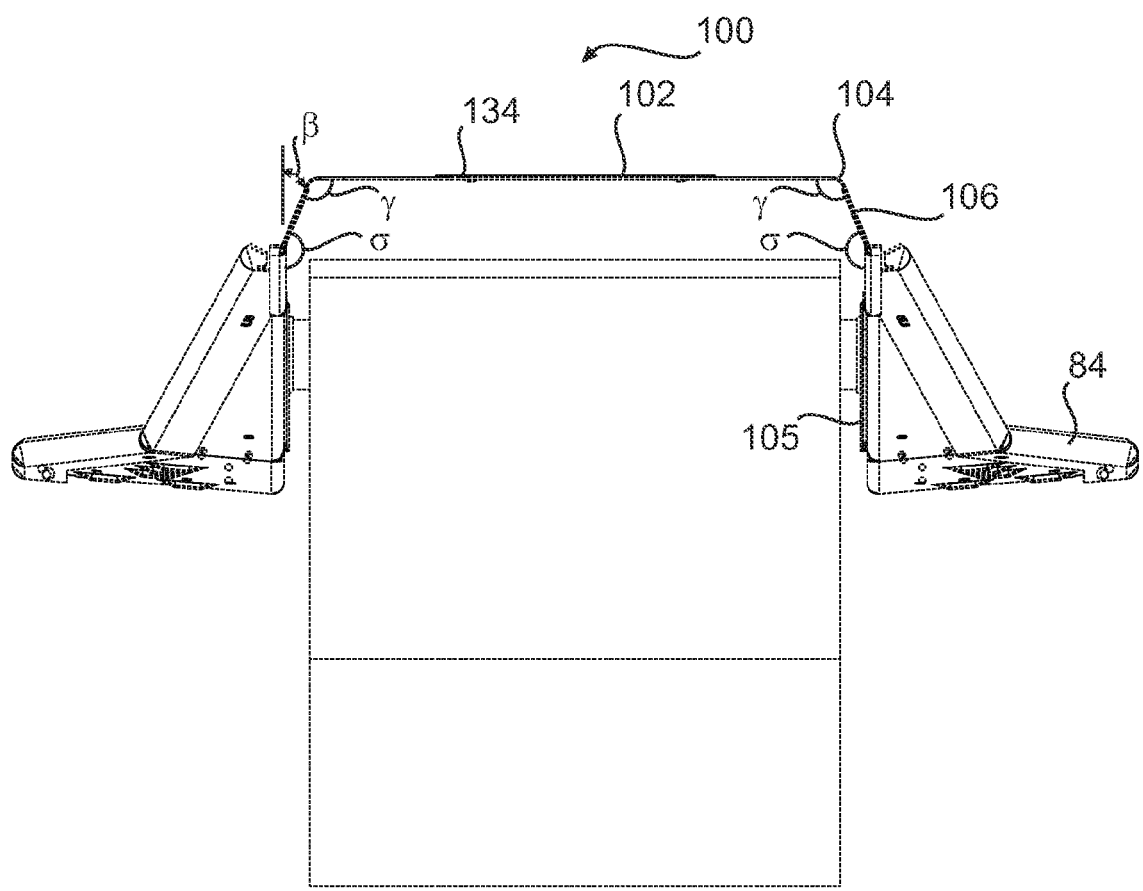
FIG. 5 is a rear view of the drive track and tunnel illustrated in FIG. 5.

The tunnel 100 can be manufactured by applying known metal-bending techniques or by assembling separate components of the tunnel together. Similarly, the footrests 84 may be integrally formed with the tunnel 100 however the footrests 84 are preferably attached to the substantially vertical sidewalls 105 as illustrated in FIGS. 4 and 5.

Figure 6:
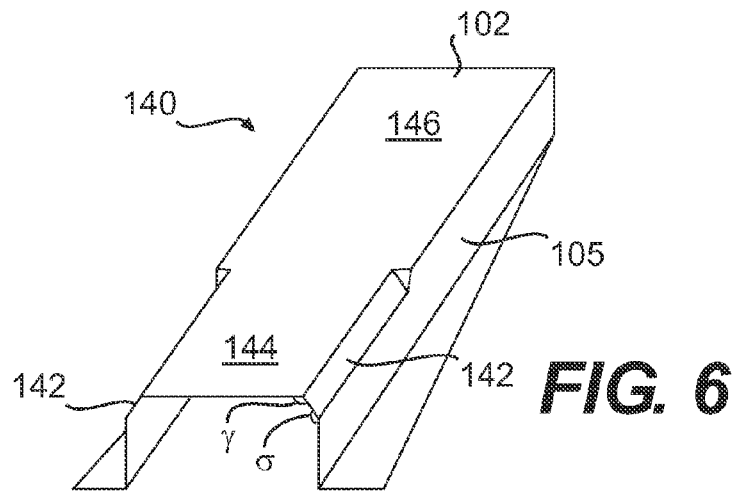
FIG. 6 is a schematic front isometric view of a tunnel in accordance with another embodiment of the invention.

FIG. 6 illustrates another embodiment of a tunnel 140 shown in isolation. Tunnel 140 includes a generally planar top portion 102, generally planar vertical sidewalls 105 and a pair of interconnecting portions 142 forming a bevel portions connecting the forward portion of the sidewalls 105 to the forward portion of the top portion 102. The exterior surfaces of the interconnecting portions 142 form two angles γ and σ with the top portion 102 and the sidewalls 105 respectively. In this particular embodiment, the interconnecting portions 142 extend only partway along tunnel 140 from the forward end 144 of tunnel 140 to an intermediate point along the length of the tunnel 140. The interconnecting portions 142 provides beveled surfaces for mounting the forward portion of the straddle seat where the driver sits. The beveled portions are designed to accommodate a straddle seat featuring a forward section of reduced width that provides added leg room for the driver sitting at the forward end of the snowmobile. The narrow forward section of the straddle seat enhances the manoeuvrability and the general comfort of the driver only. The rearward portion 146 of the tunnel 140 is constructed as a prior art C-shape tunnel. As previously described for tunnel 100, each interconnecting portion 142 forms an angle γ with the top portion 102 and an angle σ with its respective sidewall 105. Both angles γ and σ are obtuse angles which form each bevel of the tunnel 140. The tunnel 140 can be manufactured by applying known metal-bending techniques or by assembling a series of riveted components. The footrests 84 may be integral with the tunnel 140 and therefore bent to shape or may be riveted to the tunnel 140 as previously described for tunnel 100.

Figure 7:
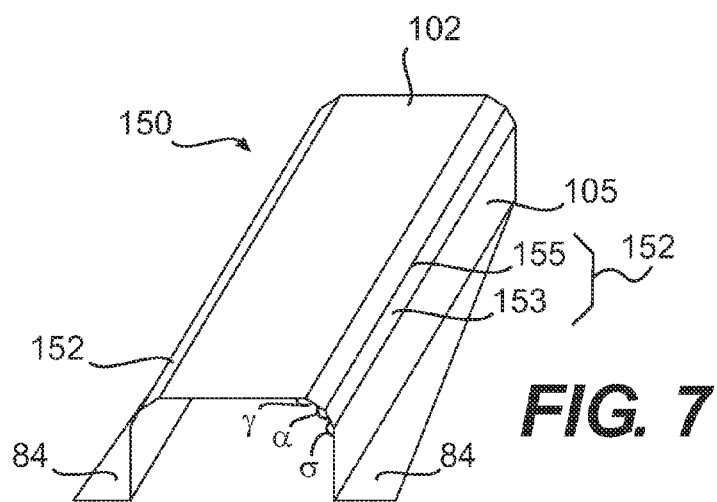
FIG. 7 is a schematic front isometric view of a tunnel in accordance with another embodiment of the invention.

FIG. 7 illustrates another embodiment of a tunnel 150 shown in isolation. Tunnel 150 includes a generally planar horizontal top portion 102, generally planar vertical sidewalls 105 and a pair of interconnecting portions 152 extending the entire length of tunnel 150 and connecting the sidewalls 105 to the top portion 102. In this particular embodiment, the exterior surfaces of the interconnecting portions 152 form an angle γ with the top portion 102 and an angle σ with the sidewalls 105. Each interconnecting portion 152 include two angular segments 153 and 155 which together form the interconnecting portions 152 and provide surfaces onto which a narrow straddle seat can be affixed to give added leg room for the rider and/or passenger of the snowmobile thereby enhancing the general comfort of the rider and passenger. Each interconnecting portion 152 includes a central angle α formed between the two angular segments 153 and 155, an angle γ formed between the top portion 102 and the angular segment 155, and an angle σ formed between the angular segment 153 and its respective sidewall 105. The angles α, γ and σ are all obtuse angles comprised between 90° and 180°. The tunnel 150 can be manufactured by applying known metal-bending techniques or by assembling a series of riveted components. The footrests 84 may be integral with the tunnel 150 and therefore bent to shape or may be riveted to the tunnel 150 as previously described for tunnel 100.

Figure 8:
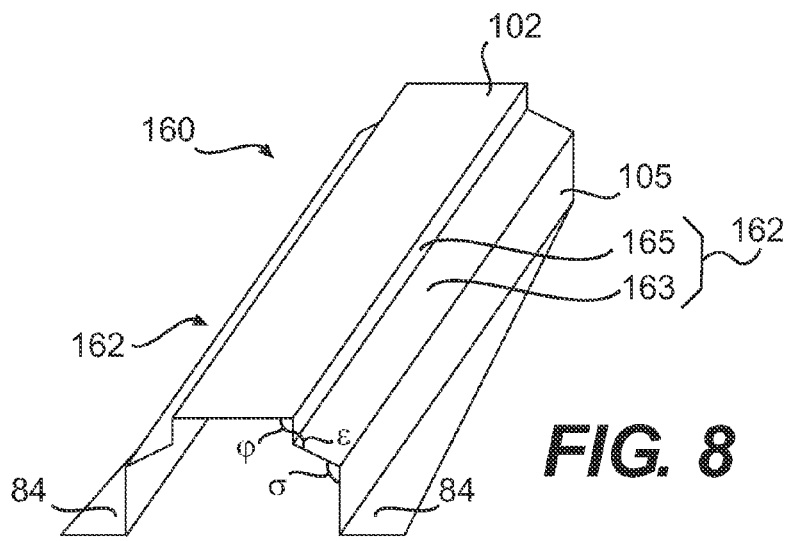
FIG. 8 is a schematic front isometric view of a tunnel in accordance with yet another embodiment of the invention.

FIG. 8 illustrates yet another embodiment of a tunnel 160 shown in isolation. Tunnel 160 includes a generally planar horizontal top portion 102, a generally planar vertical sidewalls 105 and a pair of interconnecting portions 162 extending the entire length of tunnel 160 and connecting the sidewalls 105 to the top portion 102. The interconnecting portions 162 form a right angle φ with the top portion 102 and an angle σ with the sidewalls 105. Each interconnecting portion 162 include two segments 163 and 165 forming an angle ε which together form the interconnecting portions 152 and provide surfaces onto which a narrow straddle seat can be affixed to give added leg room for the rider and/or passenger of the snowmobile thereby enhancing the general comfort of the rider and passenger. Each interconnecting portion 162 includes a central angle ε formed between the two segments 163 and 165, an angle φ formed between the top portion 102 and the segment 165, and an angle σ formed between the segment 163 and its respective sidewall 105. Whist the segment 165 is shown forming a right angle φ with the top portion 102 of the tunnel 160, the segment 165 may form a different angle with the top portion 102 which will reduce or increase the angle ε formed between the two segments 163 and 165 and may affect the angle σ formed between the segment 163 and its respective sidewall 105. The tunnel 160 can be manufactured by applying known metal-bending techniques or by assembling a series of riveted components. The footrests 84 may be integral with the tunnel 160 and therefore bent to shape or may be riveted to the tunnel 160 as previously described for tunnel 100.

Figure 9:
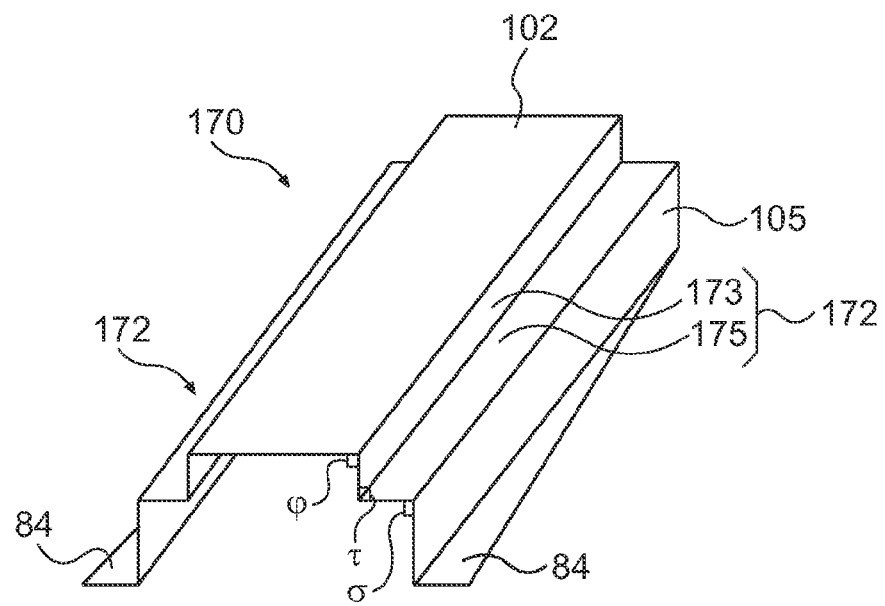
FIG. 9 is a schematic front isometric view of a tunnel in accordance with yet another embodiment of the invention.

FIG. 9 illustrates another embodiment of a tunnel 170 shown in isolation. Tunnel 170 includes a generally planar horizontal top portion 102, a generally planar vertical sidewalls 105 and a pair of interconnecting portions 172 extending the entire length of tunnel 160 and connecting the sidewalls 105 to the top portion 102. The interconnecting portions 172 form a first right angle φ with the top portion 102 and a second right angle σ with the sidewalls 105. Each interconnecting portion 172 include two segments 173 and 175 forming a third right angle τ which together form the interconnecting portions 172 and provide surfaces onto which a narrow straddle seat can be affixed to give added leg room for the rider and/or passenger of the snowmobile thereby enhancing the general comfort of the rider and passenger. Each interconnecting portion 172 includes a central angle τ formed between the two segments 173 and 175, an angle φ formed between the top portion 102 and the segment 173, and an angle σ formed between the segment 175 and its respective sidewall 105. Whist the segment 175 is shown forming a right angle τ with the segment 173, segments 173 and 175 may be arranged to form a different angle τ which will obviously affect the angle φ and σ formed between the interconnecting portion 172 and the top portion 102 and sidewalls 105. The tunnel 170 can be manufactured by applying known metal-bending techniques or by assembling a series of riveted components. The footrests 84 may be integral with the tunnel 170 and therefore bent to shape or may be riveted to the tunnel 170 as previously described for tunnel 100.

Figure 10:
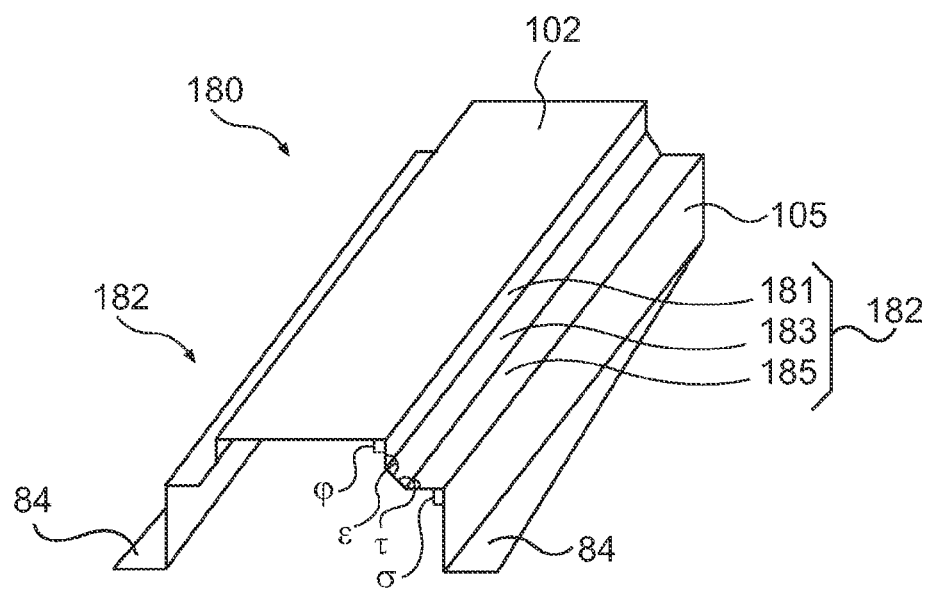
FIG. 10 is a schematic front isometric view of a tunnel in accordance with yet another embodiment of the invention.

FIG. 10 illustrates yet another embodiment of a tunnel 180 shown in isolation. Tunnel 180 includes a generally planar horizontal top portion 102, a generally planar vertical sidewalls 105 and a pair of interconnecting portions 182 extending the entire length of tunnel 180 and connecting the sidewalls 105 to the top portion 102. The interconnecting portions 182 form a first right angle φ with the top portion 102 and a second right angle σ with the sidewalls 105. Each interconnecting portion 182 include three segments 181, 183, and 185 forming a pair of angles ε and τ between them. The interconnecting portions 182 provide surfaces onto which a narrow straddle seat can be affixed to give added leg room for the rider and/or passenger of the snowmobile thereby enhancing the general comfort of the rider and passenger. Each interconnecting portion 182 includes a first angle ε formed between segments 181 and 183, and a second angle an angle τ formed between segments 183 and 185, and two right angles φ and σ formed between the top portion 102 and segment 181, and between sidewall 105 and segment 185 respectively. Whist both segments 181 and 185 are shown forming right angles φ and σ with the top portion 102 and the sidewall 105, the segments 181, 183 and 185 may be arranged differently to form different angle φ and σ with the top portion 102 and the sidewall 105 with the obvious affect of changing the angles ε and τ formed between the segments 181, 183 and 185. The tunnel 180 can be manufactured by applying known metal-bending techniques or by assembling a series of riveted components. The footrests 84 may be integral with the tunnel 180 and therefore bent to shape or may be riveted to the tunnel 180 as previously described for tunnel 100.

The embodiments of the tunnel 140, 150, 160, 170 and 180 illustrated in FIGS. 6 to 10 respectively are designed to reduce the width of the top portion of the tunnel thereby freeing lateral room to fit a narrower straddle seat which, in a preferred embodiment, features slanted sides 112 and 114 as depicted in FIG. 3. The rigid support base 122 of the straddle seat 88 include side portions 123 having a profile preferably designed to mate or registered with the interconnecting portions 142, 152, 162, 172 and 182 of the tunnel 140, 150, 160, 170 and 180 on which the narrow straddle seat will be mounted such that the straddle seat may be securely fastened to the tunnel.

All embodiments of the tunnel 100, 140, 150, 160, 170 and 180 are adapted to accommodate the drive track 60 and rear suspension component 64 including slide rails 66 and idler wheels 68 (FIG. 2) without modification. Although the tunnels 100, 140, 150, 160, 170 and 180 provides added clearance to fit a narrower straddle seat thereon and therefore enhances manoeuvrability and rider comfort, the layout and configuration of the rear components of the snowmobile remain substantially the same as in prior-art snowmobiles such that the tunnel 100, 140, 150, 160, 170 and 180 may be integrated in existing snowmobiles with little or no modification to the drive train and rear suspension.

Modifications and improvement to the above described embodiments of the present invention may become apparent to those skilled in the art. The foregoing description is intended to be exemplary rather than limiting. Furthermore, the dimensions of features of various components that may appear on the drawings are not meant to be limiting, and the size of the components therein can vary from the size that may be portrayed in the figures herein. The scope of the present invention is therefore intended to be limited solely by the scope of the appended claims.

What is claimed is:

1. A snowmobile comprising:
   a frame including a tunnel, the tunnel extending along a length of the snowmobile and having forward and rearward portions, the tunnel including:
   a top portion,
   a pair of spaced apart sidewalls, and
   at least the forward portion of the tunnel having generally flat interconnecting portions extending from each sidewall to the top portion, each interconnecting portion forming a first obtuse angle with the top portion and a second obtuse angle with a corresponding sidewall;
   an engine disposed on the frame;
   a drive track disposed below and supported by the tunnel and operatively connected to the engine for propulsion of the snowmobile;
   two skis disposed on the frame, each via a front suspension;
   a straddle seat disposed on the tunnel above the drive track and rearward of the engine; and
   a steering assembly disposed on the frame forward of the seat and operatively connected to the skis.

2. A snowmobile as defined in claim 1, wherein the first angle is less than the second angle.

3. A snowmobile as defined in claim 1, wherein the exterior surfaces of the interconnecting portions form a bevel between the top portion and each sidewall.

4. A snowmobile as defined in claim 1, wherein the surfaces of the interconnecting portions include a third angle positioned between the first angle and the second angle.

5. A snowmobile as defined in claim 4, wherein each interconnecting portion includes a plurality of surfaces angled relative to one another.

6. A snowmobile as defined in claim 1, wherein the surfaces of the interconnecting portions include a plurality of angles positioned between the first angle and the second angle.

7. A snowmobile as defined in claim 1, wherein the interconnecting portions extend the length of the tunnel.

8. A snowmobile as defined in claim 1, wherein the interconnecting portions are integrally formed with the sidewalls and the top portion of the tunnel.

9. A snowmobile as defined in claim 1, wherein the straddle seat includes a rigid support base adapted to register with the interconnecting portions of the tunnel.

10. A snowmobile as defined in claim 9, wherein the straddle seat includes a top surface extending along the length of the snowmobile and a pair of side surfaces extending downwardly from the top surface; and
wherein the side surfaces of at least a forward portion of the straddle seat are slanted.

11. A snowmobile as defined in claim 1, wherein the straddle seat has a base width equal to 90-95% of a width of the tunnel defined by the distance between the sidewalls.

12. A snowmobile as defined in claim 1, wherein the top portion of the tunnel has a width that is between 85% and 95% of a width of the tunnel defined by the distance between the sidewalls, such that a horizontal projection of each interconnecting portion has a width between 2.5% and 7.5% of the width of the tunnel.

13. A snowmobile as defined in claim 1, wherein each interconnecting portion has a height, defined as a vertical distance between the top portion and an upper end of the sidewalls, equal to 25-30% of a height of each sidewall.

14. A snowmobile as defined in claim 1, wherein the top portion, the sidewalls and the interconnecting portions are made of a unitary sheet of metal bent to shape.

15. A snowmobile comprising:
a frame including a tunnel, the tunnel extending along a length of the snowmobile and having forward and rearward portions, the tunnel including:
a top portion,
a pair of spaced apart sidewalls, and
at least the forward portion of the tunnel having a width of the top portion of the tunnel being less than a width of the tunnel defined by a distance between the spaced apart sidewalls, and at least the forward portion of the tunnel having interconnecting portions extending from each sidewall to the top portion;
an engine disposed on the frame;
a drive track disposed below and supported by the tunnel and operatively connected to the engine for propulsion of the snowmobile,
the drive track being at least partially housed in the tunnel,
the drive track including lugs, each lug having a base attached to the drive track and a tip extending away from the drive track, and
in at least the forward portion of the tunnel, a distance between the tips of the lugs disposed between the drive track and the top portion of the tunnel being less than a distance between the sidewalls and the top portion of the tunnel;
two skis disposed on the frame, each via a front suspension;
a straddle seat disposed on the tunnel above the drive track and rearward of the engine; and
a steering assembly disposed forward of the seat and operatively connected to the skis.

16. A snowmobile as defined in claim 15, wherein the width of the top portion is less than the width of the tunnel throughout the length of the tunnel.

17. A snowmobile as defined in claim 15, wherein at least a forward portion of the straddle seat has a width that is inferior to the width of the tunnel.

18. A snowmobile as defined in claim 17, wherein the straddle seat includes a top surface extending along the length of the snowmobile and a pair of slanted side surfaces extending downwardly from the top surface.

19. A snowmobile as defined in claim 15,
wherein a profile of the lugs is beveled toward the tip to prevent interference with the interconnecting portions.

20. A snowmobile comprising:
a frame including a tunnel, the tunnel extending along a length of the snowmobile and having forward and rearward portions, the tunnel including:
a top portion,
a pair of spaced apart sidewalls, and
at least the forward portion of the tunnel having interconnecting portions extending from each sidewall to the top portion, each interconnecting portion forming a first angle with the top portion and a second angle with a corresponding sidewall;
an engine disposed on the frame,
the top portion of the tunnel having a width that is between 85% and 95% of a width of the tunnel defined by the distance between the sidewalls, such that a horizontal projection of each interconnecting portion has a width between 2.5% and 7.5% of the width of the tunnel;
a drive track disposed below and supported by the tunnel and operatively connected to the engine for propulsion of the snowmobile;
two skis disposed on the frame, each via a front suspension;
a straddle seat disposed on the tunnel above the drive track and rearward of the engine; and
a steering assembly disposed on the frame forward of the seat and operatively connected to the skis.

21. A snowmobile as defined in claim 20, wherein the straddle seat has a base width equal to 90-95% of the width of the tunnel.

22. A snowmobile as define in claim 20, wherein the interconnecting portions extend the length of the tunnel.

* * * * *